Figure 1:
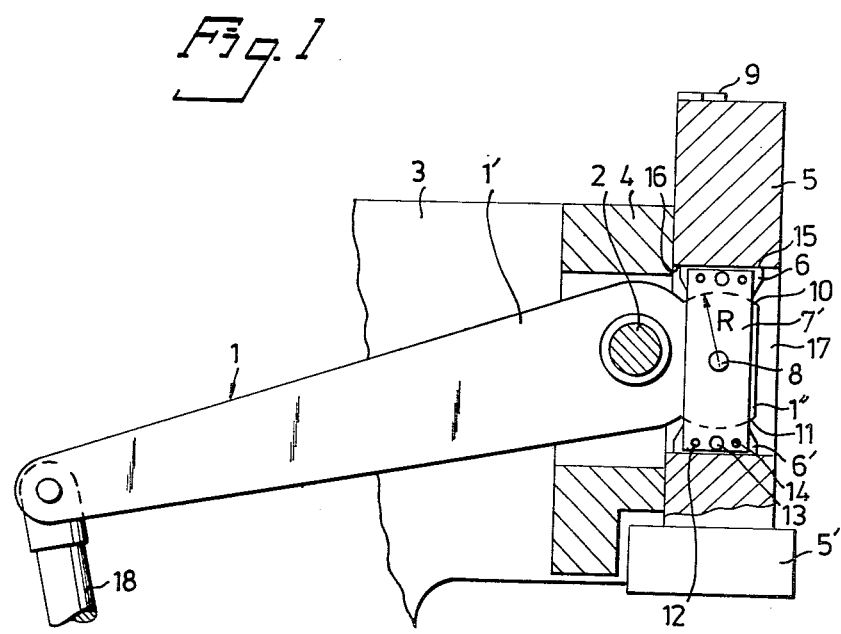

United States Patent [19]

Böhlmark

[11] 4,194,406
[45] Mar. 25, 1980

[54] LEVER MECHANISM

[75] Inventor: John Böhlmark, Mora, Sweden

[73] Assignee: F M Mattsson Aktiebolag, Mora, Sweden

[21] Appl. No.: 883,924

[22] Filed: Mar. 6, 1978

[30] Foreign Application Priority Data

Mar. 17, 1977 [SE] Sweden .................. 7703074

[51] Int. Cl.$^2$ ............................................. F16H 21/44
[52] U.S. Cl. ........................................ 74/110; 308/72; 403/59; 403/82
[58] Field of Search ............... 308/72; 403/59, 82, 403/121; 74/25, 102, 103, 518, 110

[56] References Cited

U.S. PATENT DOCUMENTS

| 441,021 | 11/1890 | Rector | 403/59 |
|---|---|---|---|
| 2,569,707 | 10/1951 | Cardell | 74/25 |
| 2,607,363 | 8/1952 | Frey | 403/59 X |

Primary Examiner—C. J. Husar
Assistant Examiner—Conrad Berman

[57] ABSTRACT

A lever mechanism including a lever which is pivotally mounted between its ends on a pivot shaft forming two lever arms. One of the lever arms is arranged to receive a force applied thereto and the other of the lever arms has an end portion arranged to transmit movement and force to a working element. The end portion has part-cylindrical surfaces which cooperate with part-cylindrical surfaces on oppositely located slide blocks. Each slide block has a planar slide surface which is parallel to a shaft of the part-cylindrical surfaces of the end portion. The planar surface of each slide block is arranged to slidably abut a planar surface on the working element. The slide blocks are non-rotatably connected to each other via their planar slide surfaces in parallel planes by means of dogging elements which are pivotally mounted on the shaft of the part-cylindrical surfaces of the end portion.

3 Claims, 2 Drawing Figures

LEVER MECHANISM

The present invention relates to a lever mechanism comprising a lever which is pivotally mounted between its ends on a pivot shaft and one lever arm of which lever is arranged to have a force applied thereto whilst the other lever arm of which lever has an end portion which is rotatably connected by means of a shaft of rotation to a working element arranged to be displaced along a guide means carrying said working element in response to movement of said lever, said shaft or rotation being parallel with said pivot shaft.

In conventional lever mechanisms of this type, which mechanisms are used in presses for example, the specific pressure between the working element and the lever arm acting upon said element is dependent upon the fact that the force is transmitted by line abutment. This means that if material deformation is to be avoided, only a limited force can be transmitted and the mechanical advantage or force multiplication must either be kept low or the lever mechanism made correspondingly large and robust.

The main object of the invention is to provide a small, compact lever mechanism which has a high mechanical advantage and which enables the mechanical-strength properties of the lever and the material from which it is made to be optimally utilised.

This object is achieved by the invention as defined in the claims.

Figure 2:
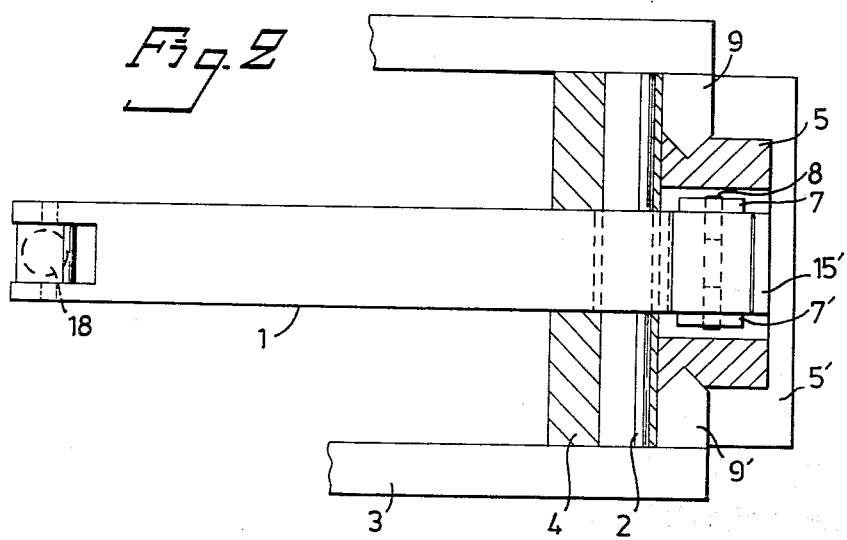

An embodiment of the invention will now be described with reference to the accompanying drawing, in which FIG. 1 is a partially cut away side view of a lever mechanism according to the invention, and FIG. 2 is a plan view of the mechanism illustrated in FIG. 1.

A lever 1 is pivotally mounted on a shaft 2 whose ends are mounted on a bearing plate 4 in a frame 3. The lever comprises a long lever arm 1' and a short lever arm 1''. The end part of the lever arm 1'' is provided with two part-cylindrical surfaces 10, 11 whose cylinder axes coincide with a rotation shaft 8, which in the illustrated case is divided into two studs. Pivotally mounted on the rotation shaft 8 are two dogging plates 7, 7' the ends of which project over the two part-cylindrical surfaces 10, 11. Located between the ends of the two dogging plates 7, 7' are two slide blocks 6, 6', Each of the slide blocks 6, 6' has a part-cylindrical surface having the same radius of curvature R as the part-cylindrical surfaces 10, 11. Thus, there is a large pressure-transmitting slide surface between the lever arm 1'' and respective slide blocks 6, 6'. In order to hold the slide blocks in a correct position relative to one another and relative to the lever arm 1'', and in order to move the slide blocks to their correct position when the lever arm 1'' is pivoted, the ends of the dogging plates 7, 7' are non-rotatably connected with the ends of the dogs 6, 6' by means of pins, for example pins 12, 13, 14.

The outwardly facing surface of each slide block, for example, the surface 15 on the slide block 6, is planar and parallel with both the pivot shaft 2 and the rotation shaft 8. The planar, finely finished surface 15 of the slide block 6 cooperates with a planar, finely finished surface in a bore 17 arranged in a working element 5. The working element 5, which is arranged, for example, to hold a tool on a carrier element 5', for example a punch, has two U-shaped grooves (FIG. 2) in its outer surfaces, these grooves being mounted on guides 9, 9'. The lower planar surface 15', which is parallel with the upper planar surface 15, cooperates with the planar surface of the slide block 6'. The planar slide surfaces, for example 15, 16, extend perpendicularly to the linear movement direction of the working element 5.

When the lever arm 1' is rotated clockwise, for example by means of a piston rod 18, the lever arm 1'' will also be rotated clockwise around the shaft 2 and the shaft 8 will be moved along a circular arc determined by the radius between the centre lines of the shafts 2 and 8. A sliding movement will then take place between the mutually cooperating cylindrical surfaces, and since the ends of the dogs 7, 7' are non-rotatably connected with the slide block, the slide blocks will be moved perpendicularly to the downward movement of the working element 5. During the whole of this movement, a large surface will be maintained between the elements movable relative to one another, and therewith an extremely large force can be transmitted. This force is only limited by the mechanical strength of the lever and the ability of the material to withstand the load.

I claim:

1. A lever mechanism comprising a lever (1) which is pivotally mounted between its ends on a pivot shaft (2) and one lever arm (1') of which lever is arranged to have a force applied thereto while the other lever arm (1'') of which lever has an end portion arranged to transmit, via two mutually opposed part-cylindrical surfaces (10, 11), movement and force to a working element (5) adapted to be moved along a guide means (9) carrying said working element in response to movement of the lever, characterised in that cooperating with respective part-cylindrical surfaces (10, 11) on said end portion is a part-cylindrical surface on a slide block (6) having the same radius as the part-cylindrical surface cooperating with said end portion, said slide block having remote from its part-cylindrical surface a planar slide surface (15) which is parallel with the shaft of the part-cylindrical surface of the slide block and which planar slide surface is arranged to slidably abut a planar surface (16) on said working element (5); and in that the two slide blocks are non-rotatably connected to one another via their planar slide surfaces in parallel planes by means of dogging elements (7) which in turn are pivotally mounted on a central rotation shaft (8) arranged between the two part-cylindrical surfaces of the end portions.

2. A lever mechanism according to claim 1, characterised in that all part-cylindrical surfaces have substantially the same axial length.

3. A lever mechanism according to claim 1 or 2, characterised in that each dogging element (7) comprises a plate whose centre is rotatably mounted on the rotation shaft (8) and the mutually opposing end portions of which are non-rotatably connected with the ends of respective slide blocks facing the plates.

* * * * *